United States Patent [19]

Fouchey et al.

[11] Patent Number: 4,679,327
[45] Date of Patent: Jul. 14, 1987

[54] FRONT WHEEL DRIVE VEHICLE, AUTOMATIC TOE SET ALIGNMENT SYSTEM, THEREFOR

[75] Inventors: John W. Fouchey, Sterling Heights; Thomas E. Chamberlain, Garden City, both of Mich.

[73] Assignee: Chrysler Motors Corporation, Highland Park, Mich.

[21] Appl. No.: 882,565

[22] Filed: Jul. 7, 1986

[51] Int. Cl.[4] .............................................. G01B 5/255
[52] U.S. Cl. ................................... 33/203.13; 33/288
[58] Field of Search ............... 33/203, 203.15, 203.13, 33/288, 203.12

[56] References Cited

U.S. PATENT DOCUMENTS

| | | | |
|---|---|---|---|
| 3,208,154 | 9/1965 | Pancoast | 33/203.13 |
| 3,908,280 | 9/1975 | Murakami et al. | 33/203.13 |
| 4,393,694 | 7/1983 | Marten et al. | 33/203.13 X |
| 4,443,951 | 4/1984 | Elsasser et al. | 33/203.13 |
| 4,457,075 | 7/1984 | Murata | 33/203.15 |

*Primary Examiner*—William D. Martin, Jr.
*Attorney, Agent, or Firm*—Wendell K. Fredericks

[57] ABSTRACT

Automatic measurement of toe setting, thrust angle and run-out compensation provide data for automatic adjustment of the toe planes of front wheels of a motor vehicle. Vehicle stabilizers are employed for moving the vehicle so that the center line of the vehicle is coincident with the center line of the toe-set alignment system. Transducer units derive static toe angles and camber, as well as dynamic run-out compensation values for all from wheels of the vehicle.

3 Claims, 14 Drawing Figures

FRONT WHEEL DRIVE VEHICLE, AUTOMATIC TOE SET ALIGNMENT SYSTEM, THEREFOR

BACKGROUND OF THE INVENTION

1. Field of the Invention

The present invention relates to apparatus and method for aligning the front toe planes of a motor vehicle and, more particularly, in a preferred embodiment, to apparatus and methods for automatically aligning the front toe planes of a motor vehicle so as to minimize tracking errors of the front wheels with respect to the rear wheels.

2. Description of the Prior Art

An illustrative environment where application of the principles of the present invention is particularly advantageous is in wheel alignment systems for automobile manufacturer's use such as, for example, the vehicle front end alignment system for measuring camber and toe as described in U.S. Pat. No. 4,443,951 of Elsasser et al. dated Apr. 24, 1984. There, electrical signals are derived which are indicative of amount of camber and toe-in misalignment from a single reference axis. Actual values of toe-in and camber are compared in a reference-actual value comparator and correcting magnitudes are displayed. Mechanical adjustments to correct the misalignment are performed. Such an arrangement allegedly provides suitable front end alignments with respect to the longitudinal axis of the vehicle.

Another method and apparatus for measuring toe and camber of wheels on motor vehicles is described in U.S. Pat. No. 4,457,075 of Murata dated July 3, 1984. There, toe-in of front and rear wheels are performed simultaneously with respect to two parallel predetermined vertical surfaces. Also, camber measurements are made. To perform the measurements, the vehicle must be parked parallel with the vertical reference walls. Although it appears that thrust angle parameters are used to correct for toe-in, the offset of the center line of the vehicle with respect to the vertical references appear to not be of significance in correcting for vehicle off-center steering.

SUMMARY OF THE INVENTION

A method and apparatus for automatically aligning the front toe planes of motor vehicles so as to minimize tracking errors of the front wheels with respect to the rear wheels.

Automatic stabilizers are used to laterally move the vehicles to bring its center line in substantial alignment with a reference line of the system. From this common reference actual thrust angles, toe set angles and camber angles of the vehicle are determined.

Automatic means are used to perform toe set adjusting of the tie rods and for torquing the lock-nuts which are used to hold the toe set adjustment.

DESCRIPTION OF THE DRAWINGS

FIGS. 1A-1J are line drawing figure illustrative of a variety of alignments of front and rear toe with respect to thrust angle;

DETAILED DESCRIPTION OF A PREFERRED EMBODIMENT

FIGS. 1A-1J are illustrative of the various alignments of front and rear toe of a vehicle. Toe, generally measured in degrees or inches, is the distance the front edges of the tires are closer (or farther apart) than the rear edges. LFT, RFT, LRT and RRT are abbreviations used to designate left and right front toe and left and right rear toe, respectively.

Often, the rear wheels do not track the front wheels. This can be due to the lack of symmetry between toe of the front and rear wheels and it could also be that the rear axle may be thrust at an angle (TA) away from the center line of the vehicle (CV). When there is a thrust angle, the front wheel toe positions must be corrected to compensate for the misalignment in order for the rear wheels to tow or follow in substantially track parallelism with the front wheels. Usually, the rear axle is fixedly mounted to the chassis of the vehicle and is not easily adjusted to correct for thrust angle.

Thrust angle is determined by solving equation (1)

$$TA = LRT - RRT/2 \qquad (1)$$

The direction of the thrust angle, negative or positive, is determined by considering the following expressions:

(a) If LRT is more positive than RRT, then TA is positive;
(b) If LRT is more negative than RRT, then TA is negative;
(c) If RRT is more positive than LRT, then TA is negative; and
(d) If RRT is more negative than LRT, than TA is positive.

If thrust angle (TA) is positive then LFT=LFT+TA and RFT=RFT−TA. If thrust angle (TA) is negative, then LFT=LFT−TA and RFT=RFT+TA. As shown in FIG. 1, FIGS. 1A-1C provide Zero TA and do not require any front wheel tracking corrections. FIGS. 1D-1J assume front toe is correct, but the vehicle has thrust angle problems. The representative correction values (VK) that should be injected into LFT and RFT are indicated.

In addition to thrust angle problems with respect to the center line of the vehicle (CV), when various alignment equipment is used, the misalignment of (CV) with respect to th center line of the alignment system (CS) often induces additional alignment errors.

Figure 1A:
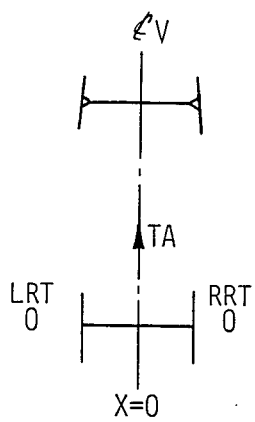
Figure 1B:
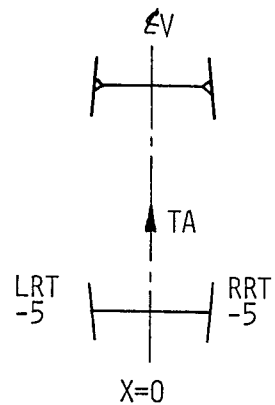
Figure 1C:
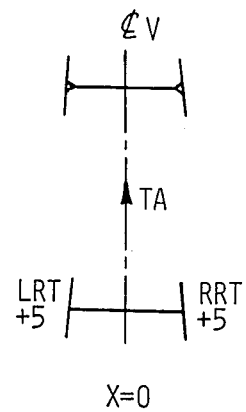
Figure 1D:
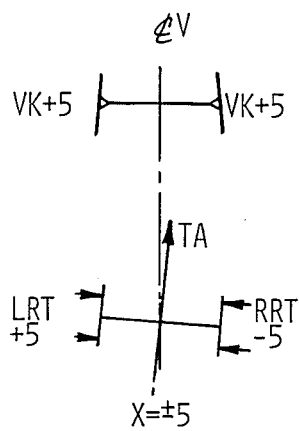
Figure 1E:
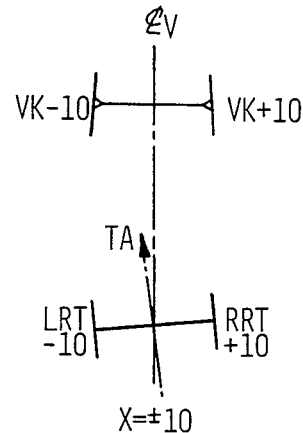
Figure 1F:
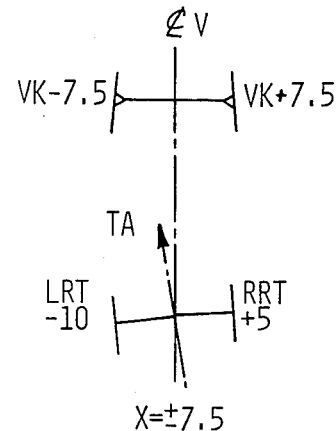
Figure 1G:
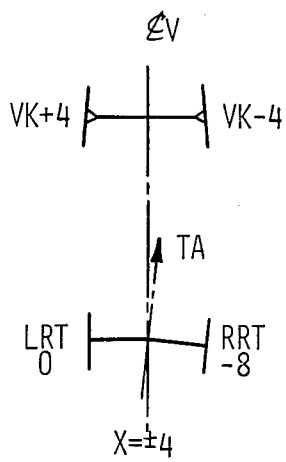
Figure 1H:
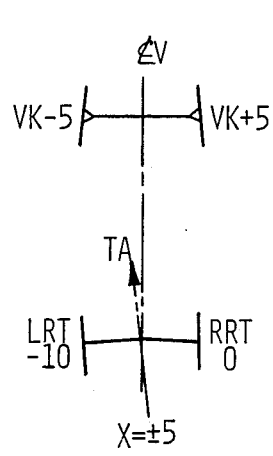
Figure 1J:
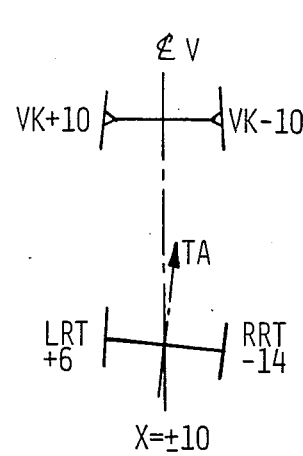
Figure 2:
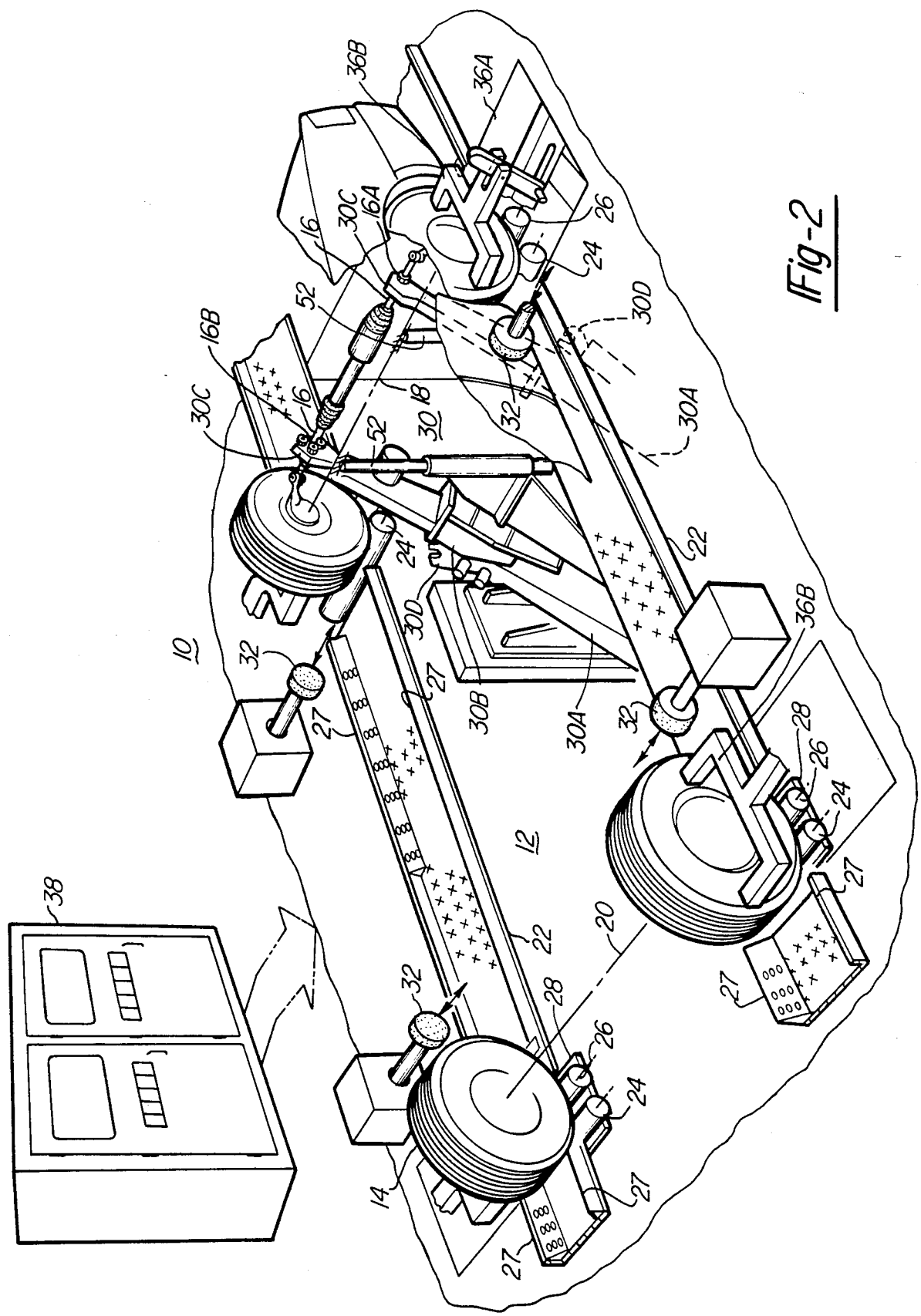
FIGS. 2 is a perspective view of a preferred embodiment of an automatic toe set system.

Referring now to FIG. 2, there is shown a preferred embodiment of an automatic toe set system 10 for determining and performing a correct toe setting for a vehicle 12. System 10 includes means for bringing the longitudinal center line of vehicle 12 in substantial coincidence with the longitudinal center line of the toe set system.

Vehicle 12, depicted with the passenger compartment missing, having four wheels 14, two tie rods 16 and tie rod jam nuts 16A, a steerable front axle 18 and non-steerable rear axle 20, (the axles being shown as dash and dot lines) is positioned on left and right elevated tracks 22 of the toe set system 10. Tracks 22 include a recessed swivelly mounted drive and brake rollers, 24 and 26, respectively; the rear pairs of rollers being mounted on a recessed roller carriage 28 which can be electrically adjusted back and forth along tracks 22 so as to position the rear rollers to match the wheel base of the vehicle. Vehicle 12, illustratively the chassis of a Chrysler LeBaron automobile is driven onto tracks 22 at floor level. Positioned to receive the front surfaces of each wheel are a pair of forty-five degree ball roller plates 27 used to center the wheels on track 22. From below floor level, from a garage pit, a pair of tie rod adjustment mechanisms 30—30 are projected along an inclined path so as to enable a pair of adjustment heads 30C—30C of the mechanism to contact serrated adjustment surfaces 16B—16B of tie rods 16—16. Each adjustment mechanism 30 includes a guide way 30A, a rack and pinion 30B, an air cylinder and drive unit (not shown) and adjustment head 30C and a nut driver head 30D.

Four vehicle stabilizers 32 disposed to contact front and rear fender supports (not shown) are used to laterally shove vehicle 12 over the drive and brake rollers 24 and 26, respectively, on tracks 22—22 so as to position the center line of vehicle 12 in coincidence with the center line of the system. In doing this, the adjustment mechanism 30 is also brought into alignment with the serrated surfaces of the tie rods.

A symmetry sensor 34 (best seen in FIG. 3) is disposed at each corner of vehicle 12 to electrically sense position of the vehicle on track 22.

Setting transducer units 36, mounted on transport rails 36A at each wheel, include a wheel setting bar assembly 36B slideably mounted to rail 36A which provides structure for at least one transducer (not shown in this figure) used to detect toe angle of each wheel and another transducer (not shown) for detecting camber, the number of degrees the top of the wheel is tilted inward or outward from a true vertical. Camber is a measure of inclination of the wheels in a vertical plane.

Control system 38, located at floor level to one side of track 22, is used to provide the data acquiring and converting circuits, as well as the drive control circuits needed to control the entire automated toe set operation.

Figure 3A:
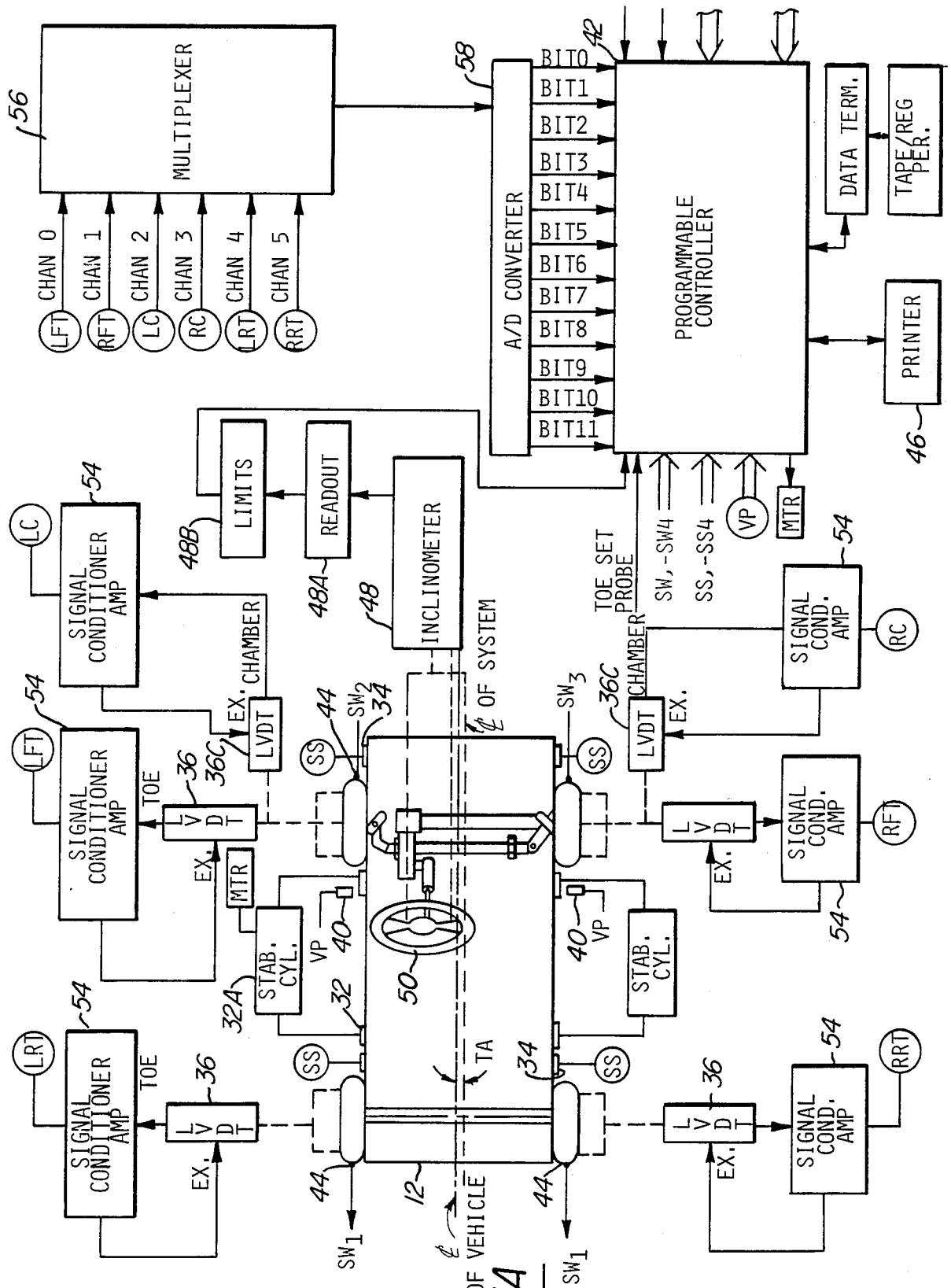
FIGS. 3A-3B are block diagrams of the automatic toe set system of FIG. 2.

Control system 38 includes substantially all the electronics for performing automatic toe set such as signal conditioner circuits 59 of FIG. 3, inclinometer readout 48A, limit comparator circuit 48B, multiplexer 56, analog to digital converter 58, programmable controller 42 and display 70.

Referring to FIG. 3, there is shown a block diagram of the toe set system 10. Vehicle 12 is shown with the vehicle center line displaced from the center line of the system, creating an offset error. Also, vehicle 12 has a thrust angle, i.e., perpendicularity between rear axle and center line of the vehicle is in error by the amount indicated by thrust angle (TA).

Prior to driving vehicle 12 onto toe set system 10, the rear roller carriages 28 of FIG. 2 are moved to the position to match the wheel base of vehicle 12. Then, the vehicle 12 is driven onto track 22 placing the wheels between the drive and brake rollers 24 and 26 of FIG. 2. When wheels 14 are between the rollers, wheel position trip switches (SW1-SW4) 44 initiate electrical signals to programmable digital controller 42. Controller 42 examines data from input devices wired into the input/output structure. It compares this data to a user entered control program and, subsequently, generates logic commands which, through output modules, control the toe set system.

Before controller 42 will operate, several preconditions must occur; namely, a vehicle present photocell 40 must detect presence of vehicle, the trip switches 44 must be closed and the track sheet for vehicle 12 must be in printer 46 (in automobile factory operations, records of test results are generally documented). An inclinometer 48, a steering wheel leveling fixture, must be used to position spokes of steering wheel 50 within acceptable limits of levelness. Output from inclinometer 48 is applied to a digital readout meter 48A and then to a limit comparator circuit 48B which sends an electrical signal indication to controller 42.

Controller 42 generates logic commands to cause stabilizer cylinders 32A to move the front and rear stabilizers 32 against structural regions of vehicle 12 which can sustain reasonable shoving action of the stabilizers. Symmetry sensors 34 produce electrical signals to controller 38 to coincide substantially with the center line of the system. The four wheel sensing arms 36B are advanced to the side of wheels 14.

On completion of the above operations, the toe set system enters a "START" cycle. A pair of toe set sensing probes 52 of FIG. 2 are raised vertically by air cylinder and drive 52A until an end of the probes touch the main front cross member (not shown) near axle 18. Probes 52 are used to provide electrical signals indicative of the location of the tie rods with respect to the position of the adjustment head 30C of mechanism 30.

Figure 3B:
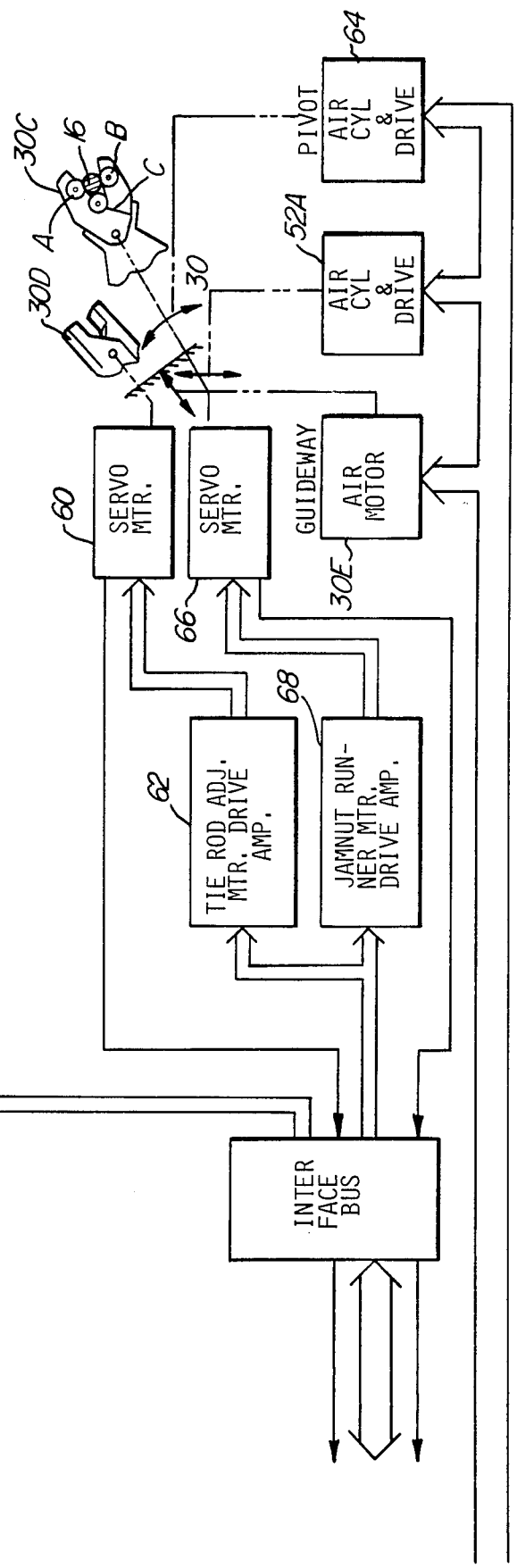

The tie rod adjusting mechanisms 30 in FIG. 2 are then driven upward along guideways 30A by an air motor 30E of FIG. 3B coupled to a rack and pinion 30B of FIG. 2. Mechanism 30 continues upward until the adjusting heads 30C contact a tie rod 16 along a serrated circumference region 16A used as grips for adjusting the tie rods.

The drive pressure from guideway air motor 30E is then reduced to a value that will hold the heads 30C in place without pushing the tie rod forward to keep from changing camber valves which distort toe sets. The tie rod's D.C. servo adjusting motors 60, driven by tie rod adjustment motor drive amplifier 62 in response to commands from controller 42, initiate a rough adjustment of the tie rods 16 so as to bring the display readout 70 of toe set within a chosen limit with the toe set adjustment heads 30C on the tie rod 16, and with the transducer units 36 against the tire walls of the front wheels, the camber angles can be sensed by the left and right camber transducers 36C. Transducers 36 and 36C generate a signal, e.g., a millivolt level signal, which is applied to respective signal conditioning amplifiers 54, that provide suitable voltage level signals to analog to digital converter 58 via multiplexer 56. At converter 58, the voltage signals are converted illustratively to 12 bit numbers. These 12 bit numbers are bussed to controller 42 where they are stored temporarily in memory as digital values representations of the camber angles (LC and RC).

Amplifiers 54 also have circuitry for providing excitation (EX) for the transducers.

At the same time camber angles are being obtained, left and right, front and rear static toe angles (LFT, RFT, LRT and RRT) are sensed by respective transducers 36—36. The output signals from transducers 36—36 are individually conditioned by signal conditioning amplifiers 54—54 and sequentially transferred by multiplexer 56 to analog to digital converter 58 for conversion into digital numbers illustratively to 12-bit numbers indicative of the detected toe angles. The toe angle numbers are bussed to controller 42 where they are stored in designated sections of memory.

After obtaining static readings of toe and camber, a run-out compensation routine is performed in which all four wheels are rotated through approximately 400 degrees and the high points and depressions of the side walls of each wheel 44 are averaged in controller 42 and used to refine the camber and toe readings in a chosen manner.

If either camber angle (LC or RC) is outside of predetermined limits, the operation is aborted, the track sheet in printer 46 is updated to reflect the situation and then the toe set system is returned to the standby condition without completing any further automatic operations. The operation is stopped at this time because out-of-tolerance camber angles drastically affect the toe of the front wheels. If the camber angles are acceptable, the automatic operation sequences are continued.

After initial toe set, run-out compensation and camber are performed, the thrust angle of the non-steering wheels is determined. The run out compensation averages and the LRT and RRT values are used to come up with a thrust angle value as explained with reference to FIG. 1.

Using the thrust angle, run-out compensation and initial toe-angle data, a final corrected toe set value is determined for each front wheel. If the final toe set is not within limits, the controller 42 sends a control signal to the printer to update the track sheet for the vehicle with the information concerning toe set and then the vehicle is released and the operation is stopped. If the values are within the predetermined limits, controller 42 sends out digital control signals to tie rod adjustment drive amplifier 62 which, in turn, drives servo motor 60, that causes adjustment head 30C to adjust each tie rod. At the completion of the toe set adjustment, the adjustment heads retract. The adjustment heads 30C are comprised of two serrated drive rollers A and B in FIG. 3B and a third positioning roller C.

After retraction of the adjustment heads 30C, a pivot air cylinder drive 64 is activated by controller 42 to cause the adjustment heads 30C to rotate to a storage position and place the nut runners 30D in a working position.

Then, guideway air motor 30E is used to drive the nut runners into near engagement with the jam nuts 16A.

Air cylinder operated adjusting cross-slides (not shown) used in conjunction with the nut runners, are used to move the nut runners along the axis of the tie rod to engage the nut runners to the jam nuts. As the cross-slides move the nut runners, servo motor 66 is driven by jam nut runner motor drive amplifier 68 so that the nut runners are turning as the jam nuts are contacted. This is done to ensure good engagement of the jam nuts and the nut runners. The nut runners continue to rotate the jam nuts until a specified torque value is achieved. The servo systems sense increases in motor current substantially proportional to the increases in torque. When a chosen current limit is reached, the torque of the jam nuts is within specification. If the jam nuts cannot be tightened, the operation is aborted. The controller 42 causes the torque direction of the nut runners to reverse for one scan of the processor routine within controller 42 to ensure that the nut runners are not "frozen" on the jam nuts. This will not affect the torque settings because the amount of rotation is very small. Upon completion of the torquing, the nut runners are retracted. The vertical toe setting sensing probes 52 are retracted and the "COMPLETE" of cycle signals are issued and the printer provides a completed track sheet for the vehicle.

Figure 4A:
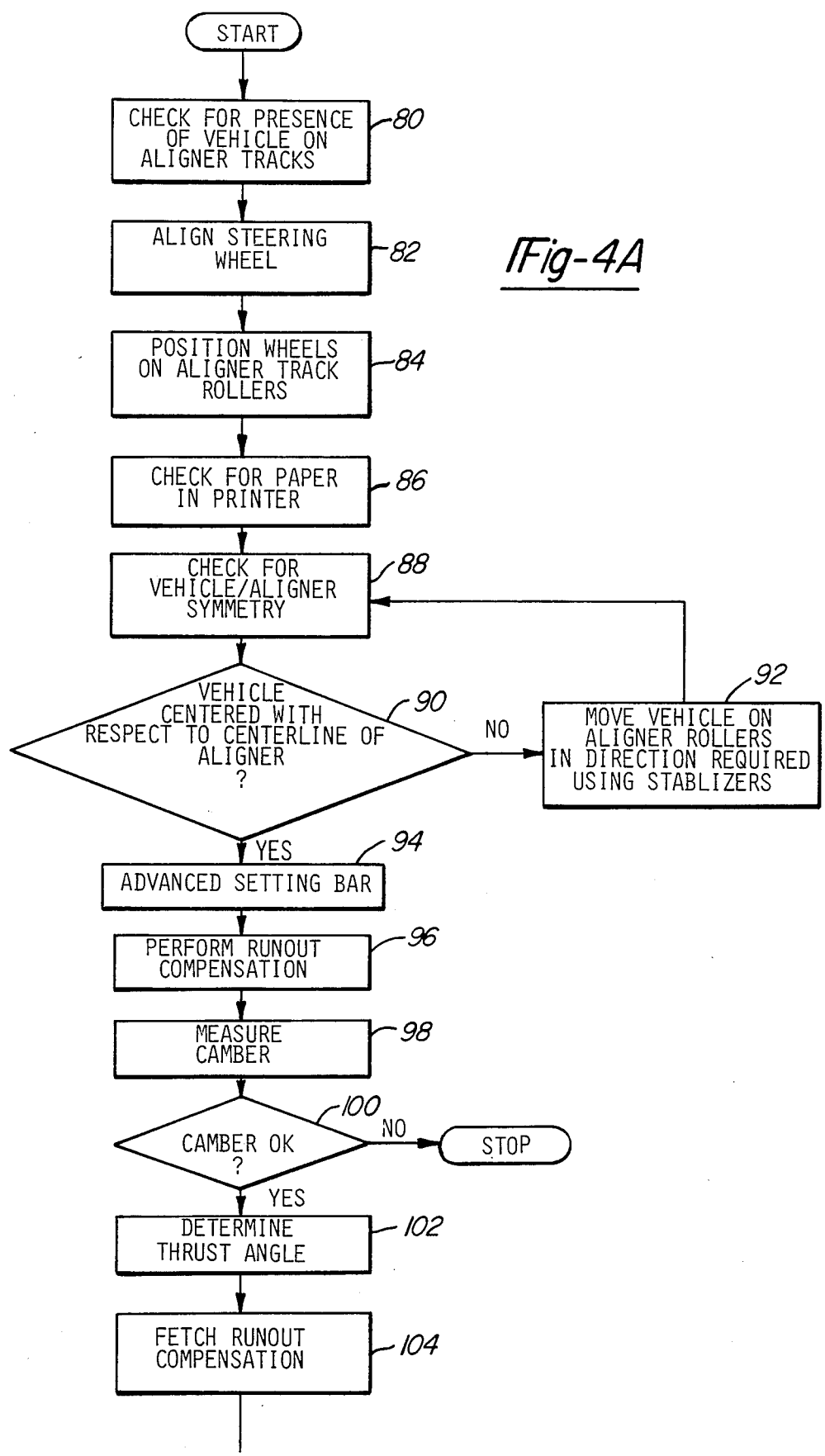
FIGS. 4A-4B are flow charts illustrative of sequence operation of the toe set system.
Figure 4B:
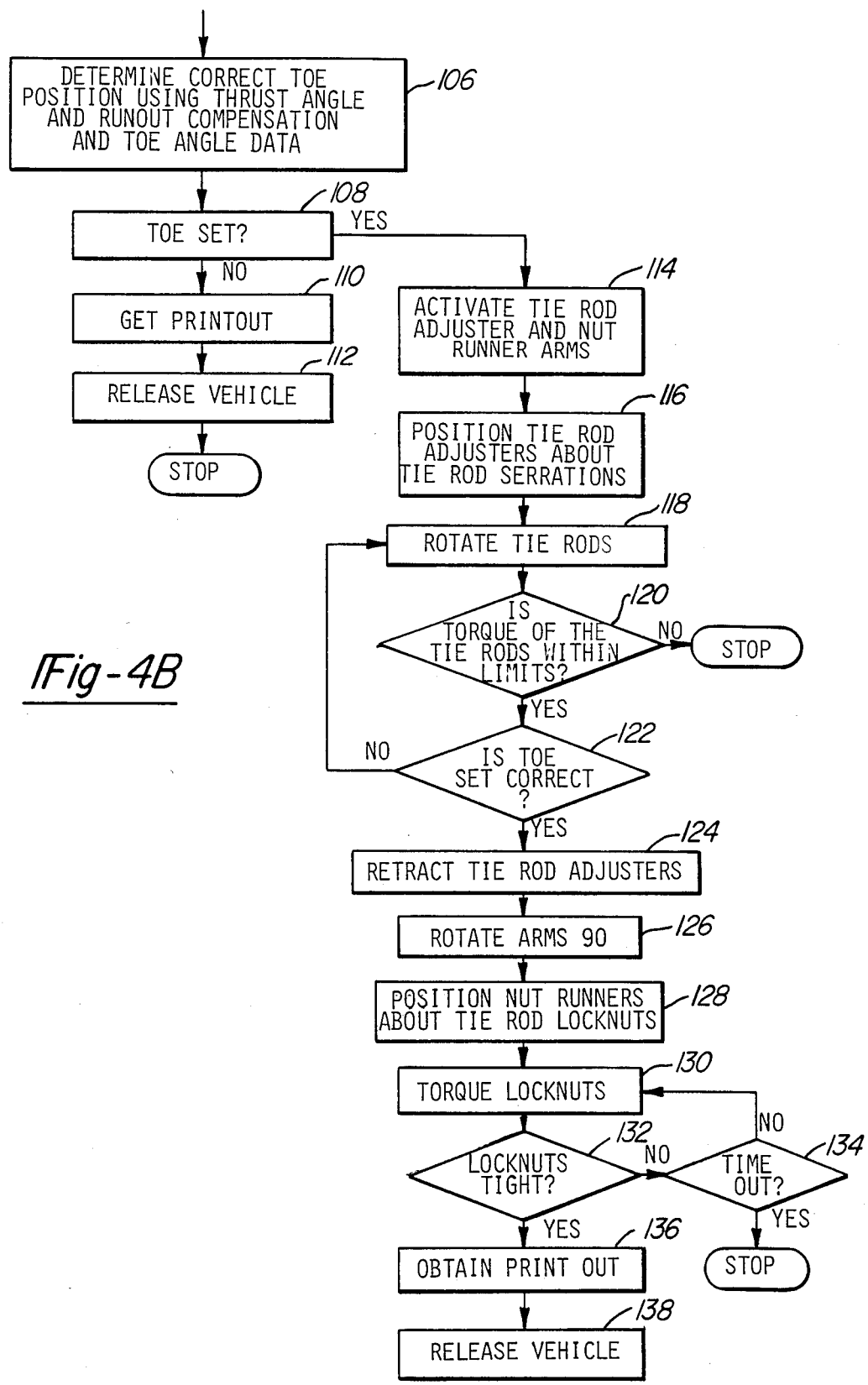

With reference now to FIG. 4, the sequence of operation of the system is shown in flowchart form. The flowchart is described in connection with FIGS. 1, 2 and 3.

Starting with the first block 80 of the flowchart of FIG. 3, vehicle 12 of FIG. 2 is driven on track 22 photocell detector switch 40 and the trip switches 44 provide a signal to controller 42 of the presence of vehicle 12. In block 82, steering wheel 50 of FIG. 3 is aligned so that the spokes are horizontal and aligned perpendicular to the line of travel so that steering will feel comfortable to the user. In block 84, all four wheels 44 are positioned on the rollers. Carriage 28 may have to be moved to bring the rear drive and brake rollers 24 and 26, respectively, in alignment with the wheel base of vehicle 12. In block 86, a track sheet in printer 46 supplies a signal that controller 42 looks for.

Once the above steps are performed the automatic toe set 10 enters a "START" cycle which includes an instructionary block 88 which checks for vehicle and aligner symmetry in response to signals to controller 42 from symmetry sensors 34-34. Then, in conjunction with decisional block 90 and instructional block 92, it is determined if the center line of vehicle 12 is in alignment with the center line of the toe set aligner system. If vehicle 12 isn't in alignment, stabilizers 32—32 are driven to shove vehicle 12 about drive rollers 24—24 and brake rollers 26—26 to oppose misalignment. Upon completion of the centering, as in block 94, the setting bar is advanced.

As in block 98, run-out compensation is determined for all four wheels 14—14 and stored by controller 42. In the next instructional block 96, camber is measured. Transducers 36C provide static camber angle information to controller 42.

As with decisional block 100, predetermined limits are compared to the measured camber angles and a determination is made as to whether the measured values of camber are within limits. If camber is not within limits, the controller 42 aborts operation. This is done because camber is very critical with respect to toe aligning.

If camber is okay, as shown in the next block 102, thrust angles are determined. Then, as in block 104 and 106, the previously stored run-out compensation data is obtained and used with the thrust angle data in a chosen manner along with the static toe set readings for the front wheels to generate new toe set values.

As in block 108, the toe set value is compared with predetermined limits and if toe set values cannot come within limits, then the operation is aborted, a printout is provided as indicated in block 110 and the vehicle is released as in block 112.

If the toe set values are within limits as in block 114, the robotic tie-rod adjustment head and nut runner arms 30, are activated. The next block 118 instructs rotating the tie rods to bring the setting to the desired values.

Then a determination is made as whether the values imposed on the tie rods come with predetermined values as indicated by decision block 122. If the torque required to rotate the tie rods is excessive the operation is aborted as in block 120. If not, then the operation continues; as indicated in decision block 122, a determination is made as to whether the adjustments of the tie rods corrected toe set. If not, further rotating of the tie rods is performed as shown by the NO line from decision block 122. If toe set is correct as in the next instructional block 124, the tie rod adjustment heads 30C are retracted; and as in instruction of block 126, the adjustment arms 30 are rotated 90 degrees so as to bring the nut runner 30D into position with the jam nuts 16A for locking the tie rods in the correct toe set positions.

As in block 128, the nut runners are positioned about the jam nuts and in block 130, the jam nuts are torqued. Decision block 132 and 134 indicate a determination is made whether the jam nuts are all tight. Circuits are used to sense interacts in motor drive current needed to torque the jam nuts. If the current exceeds chosen limits within a certain time span, the operation is aborted. If it doesn't, as indicated in blocks 136 and 138, the complete printout of the operation is obtained and then the vehicle is released.

Although the present invention has been described with reference to a preferred embodiment, numerous modifications and rearrangements can be made, and come within the scope of the invention.

We claim:

1. A method of measuring an adjusting in and automatic toe set alignment system, toe angles of a left front wheel and a right front wheel associated with a steerable front axle of a motor vehicle, said steerable front axle being steered by a steering wheel within the vehicle, said system being of the type wherein said alignment system has a reference center line oriented in a chosen direction, wherein said right front wheel has a first tie rod for aligning the toe angle of said right front wheel and a second tie rod for aligning the toe angle of said left front wheel, and wherein a right rear wheel and a left rear wheel are mounted to a non-steerable rear axle, which method comprises:
   a. orienting the direction of a center line of said vehicle to be in alignment with said reference line of said system;
   b. positioning said steering wheel of said vehicle so that a pair of spokes of said steering wheel are oriented to be perpendicular to said reference center line of said system;
   c. obtaining acceptable camber angle values;
   d. rotating said front and rear wheels about said front and rear axles, respectively, over a predetermined angular path to obtain a run-out compensation value for each of said wheels, the run-out compensation values providing data indicative of high points and depressions of a side wall surface of said wheels;
   e. storing said run-out compensation values;
   f. measuring to obtain values of a static toe angle of each of said wheels;
   g. storing each of said static toe angle values;
   h. by using static toe angle measurements of said rear wheels, obtaining a thrust angle value of said rear axle with respect to said reference center line of said system;
   i. storing said thrust angle;
   j. utilizing said stored run-out compensation values and said thrust angle value to modify said static toe angle value of said front wheels to obtain a corrected toe angle of each of said front wheels;
   k. positioning a pair of programmable tie rod adjustment heads about said tie rods so as to be in alignment to adjust said first and said second tie rods;
   l. programming said tie rod adjustment heads so as to adjust said tie rods of said front wheel to bring said front wheel toe angles in conformance with said corrected toe angle of each of said front wheels;
   m. retracting said tie rod adjustment heads from said tie rods;
   n. positioning a pair of programmable nut runners so as to be in alignment for adjusting a jam nut for said first and another jam nut for said second tie rods; and
   o. programming said nut runners so as to torque said jam nuts a predetermined torque value so as to fix said front wheels in toe angle planes that conform to said corrected toe angle values.

2. An automatic toe set alignment system for measuring and adjusting toe angles of a left front wheel and a right front wheel associated with a steerable front axle of a motor vehicle, said steerable front axle being steered by a steering wheel within the vehicle, said system being of the type wherein said alignment system has a reference center line oriented in a chosen direction, wherein said right front wheel has a first tie rod for aligning the two angle of said right front wheel and a second tie rod for aligning the toe angle of said left front wheel, and wherein a right rear wheel and a left rear wheel are mounted to a non-steerable rear axle, which comprises:
   a. means for orienting the direction of a center line of said vehicle to be in alignment with said reference line of said system;
   b. means for leveling said steering wheel of said vehicle;
   c. means for obtaining static camber angle values of said front wheels of the type enabling obtaining a toe set of said front wheels;
   d. means for rotating said front and rear wheels about said front and rear axles, respectively, over a predetermined angular path to obtain a run-out compensation value for each of said wheels, the run-out compensation values providing data indicative of high points and depressions of a side wall surface of said wheels;
   e. means for storing said run-out compensation values;
   f. means for measuring to obtain values of a static toe angle of each of said wheels;
   g. means for storing each of said static toe angle values;
   h. measuring static toe angle means for measurements of said rear wheels for obtaining a thrust angle value of said rear axle with respect to said reference center line of said system;
   i. means for storing said thrust angle;
   j. means for obtaining a corrected toe angle of each front wheel by utilizing said stored run-out compensation values and said thrust angle values to modify said static toe angle values of said front wheels;
   k. a pair of programmable tie rod adjustment heads, one head of said pair being for adjusting said first tie rod and another head of said pair being for adjusting said second tie rod;
   l. a pair of programmable nut runners, one runner of said pair being for tightening a jam nut of said first tie rod and another runner of said pair being for tightening a jam nut of said second tie rod;
   m. means for programming said tie rod adjustment heads so as to adjust said tie rods of said front wheels to bring said front toe angles in conformance with said corrected toe angle of each of said front wheels;

n. means for retracting said tie rod adjustment heads from said tie rods;

o. means for positioning said pair of programmable nut runners so as to be in alignment for adjusting said jam nuts of each of said tie rods; and p. means for programming said nut runners to torque said jam nuts to a predetermined torque value so as to fix said front wheels in toe angle planes that conform to said corrected toe angle values.

3. Apparatus of claim 2 wherein each of said pair of programmable tie rod adjustment heads is mounted 90 degrees from each of said pair of programmable nut runners in a manner so as to permit simultaneous adjustments of said first and second tie rods and then on command permits retraction of said heads and then rotating said heads 90 degrees out of alignment with said tie rods while positioning said nut runners in alignment so as to permit said nut runner to torque said jam nuts.

* * * * *